(12) United States Patent
Shaw et al.

(10) Patent No.: US 12,703,112 B2
(45) Date of Patent: Aug. 11, 2026

(54) ROBOT HAND

(71) Applicant: Dyson Technology Limited, Wiltshire (GB)

(72) Inventors: Andrew James Shaw, Swindon (GB); Vincent Denis Clerc, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 978 days.

(21) Appl. No.: 17/797,059

(22) PCT Filed: Feb. 24, 2021

(86) PCT No.: PCT/GB2021/050463
§ 371 (c)(1),
(2) Date: Aug. 2, 2022

(87) PCT Pub. No.: WO2021/171006
PCT Pub. Date: Sep. 2, 2021

(65) Prior Publication Data

US 2023/0064919 A1 Mar. 2, 2023

(30) Foreign Application Priority Data

Feb. 27, 2020 (GB) ..................................... 2002775

(51) Int. Cl.
*B25J 15/00* (2006.01)
*B25J 9/10* (2006.01)
(Continued)

(52) U.S. Cl.
CPC ........... *B25J 15/08* (2013.01); *B25J 15/0616* (2013.01); *B25J 15/10* (2013.01)

(58) Field of Classification Search
CPC ........ B25J 15/0009; B25J 15/10; A61F 2/583; Y10S 294/907
(Continued)

(56) References Cited

U.S. PATENT DOCUMENTS 5,245,885 A 9/1993 Robertson
5,570,920 A 11/1996 Crisman et al.
(Continued)

FOREIGN PATENT DOCUMENTS

CN 102107432 A 6/2011
CN 106584490 A 4/2017
(Continued)

OTHER PUBLICATIONS

Palm Structure And Robot Hand Including The Same; Patent Number: 2018192557; Document ID: JP 2018192557 A; Date Published: Dec. 6, 2018; Inventor Name: Ozawa Ryuta, Yoneda Tomoo, Morihiro Daiki; Application No. JP 2017097580 A (Year: 2018).*

(Continued)

*Primary Examiner* — Mahdi H Nejad
(74) *Attorney, Agent, or Firm* — Tucker Ellis LLP

(57) ABSTRACT

A robot gripper including: a base section; a first finger connected to the base section by a base section joint and n phalanxes; a second finger connected to the base section by a base section joint and n+m phalanxes, each phalanx of the second finger being connected to an adjacent phalanx by a phalanx joint and the first and second fingers being opposable to one other; wherein n and m are positive integers.

16 Claims, 14 Drawing Sheets

(51) Int. Cl.

| | |
|---|---|
| ***B25J 15/06*** | (2006.01) |
| ***B25J 15/08*** | (2006.01) |
| ***B25J 15/10*** | (2006.01) |

(58) Field of Classification Search

USPC .................................... 294/111, 106; 623/64

See application file for complete search history.

(56) References Cited

U.S. PATENT DOCUMENTS

| | | | |
|---|---|---|---|
| 6,016,385 | A | 1/2000 | Yee et al. |
| 8,483,880 | B2 * | 7/2013 | de la Rosa Tames ....................... B25J 15/0009 600/595 |
| 9,351,569 | B1 | 5/2016 | Lucey et al. |
| 10,556,338 | B1 | 2/2020 | Marchese et al. |
| 2011/0040408 | A1 | 2/2011 | De La Rosa Tames et al. |
| 2011/0156416 | A1 | 6/2011 | Kawanami et al. |
| 2015/0028613 | A1 | 1/2015 | Nakayama |
| 2016/0089793 | A1 | 3/2016 | Truebenbach |
| 2016/0236354 | A1 | 8/2016 | Ishikawa et al. |
| 2016/0311117 | A1 | 10/2016 | Nagatsuka |
| 2017/0129110 | A1 | 5/2017 | Ohm et al. |
| 2017/0282379 | A1 | 10/2017 | Nakayama |
| 2018/0297200 | A1 | 10/2018 | Nakayama |
| 2019/0126493 | A1 | 5/2019 | Jonas et al. |
| 2019/0152630 | A1 | 5/2019 | Kuraoka et al. |
| 2019/0310272 | A1 | 10/2019 | Bäuerlein |

FOREIGN PATENT DOCUMENTS

| | | | | |
|---|---|---|---|---|
| CN | 109760087 | A | 5/2019 | |
| CN | 208880758 | U | 5/2019 | |
| CN | 209408519 | U | 9/2019 | |
| EP | 3081350 | A1 | 10/2016 | |
| FR | 2602170 | A1 | 2/1988 | |
| GB | 2592411 | A * | 9/2021 | ............ G01L 5/226 |
| JP | 58-045885 | A | 3/1983 | |
| JP | 59-140189 | U | 9/1984 | |
| JP | 63-237885 | A | 10/1988 | |
| JP | 64-071684 | A | 3/1989 | |
| JP | 03-043182 | A | 2/1991 | |
| JP | 2010-253571 | A | 11/2010 | |
| JP | 2011-121770 | A | 6/2011 | |
| JP | 2011173201 | A | 9/2011 | |
| JP | 4983245 | B2 | 7/2012 | |
| JP | 2017-202561 | A | 11/2017 | |
| JP | 2018089721 | A | 6/2018 | |
| JP | 2018-192557 | A | 12/2018 | |
| KR | 10-0943240 | B1 | 2/2010 | |
| KR | 10-2018-0128731 | A | 12/2018 | |
| WO | 2004/026540 | A1 | 4/2004 | |
| WO | 2016/070412 | A1 | 5/2016 | |
| WO | 2017/121681 | A1 | 7/2017 | |
| WO | 2021/171007 | A1 | 9/2021 | |
| WO | 2021/171008 | A1 | 9/2021 | |

OTHER PUBLICATIONS

Robot Hand And Flying Robot; Patent No. 6792851; Document ID: JP 6792851 B2; Date Published: Dec. 2, 2018; Inventor: Hideyuki; Application No. JP 2016097190 A; Date Filed: May 13, 2016 (Year: 2020).*

Robot Hand And Flying Robot; Document ID: JP 2017202561 A; Date Published: Nov. 16, 2017; Inventor: Tsukagoshi Hideyuki; Ashlih Dameitry; Application No. JP 2016097190 A; Date Filed: May 13, 2016 (Year: 2016).*

Robot Hand For Easy Gripping; Document ID: KR 100943240 B1; Inventor: Lee Young Tae; Application No. KR 20090075845 A; Date Filed: Aug. 17, 2009; Date Published: Feb. 18, 2010 (Year: 2010).*

Office Action received for Japanese Patent Application No. 2022-551805, mailed on Aug. 29, 2023, 11 pages (6 pages of English Translation and 5 pages of Original Document).

Examination Report received for GB Application No. 2002358.6, mailed on Feb. 22, 2023, 1 page.

Examination Report received for GB Application No. 2002776.9, mailed on Apr. 12, 2022, 3 pages.

Examination Report received for GB Application No. 2002776.9, mailed on Sep. 13, 2022, 3 page.

International Preliminary Report on Patentability received for PCT Patent Application No. PCT/GB2021/050463, mailed on Sep. 9, 2022, 8 pages.

International Search Report and Written Opinion received for PCT Patent Application No. PCT/GB2021/050464, mailed on Jun. 28, 2021, 11 pages.

International Search Report and Written Opinion received for PCT Patent Application No. PCT/GB2021/050465, mailed on Jun. 28, 2021, 12 pages.

Ruifeng Li, "Design and Application of Industrial Robot", Harbin Institute of Technology Press, Twelfth Five-Year Plan National Key Publication Program, Series on Advanced Robotics Technologies and Research Applications, Oct. 31, 2016, 9 pages.

Dongsheng You et al., "Installation, Commissioning, Maintenance and Management Technologies of Numerical Control Machine Tools", Southeast University Press, Twelfth Five-Year Planning Textbook for Nationwide Higher Vocational Technical Education, 2015, 12 pages.

International Search Report and Written Opinion received for PCT Patent Application No. PCT/GB2021/050463, mailed on Jun. 28, 2021, 11 pages.

Search Report for GB Patent Application No. 2002775.1, Issued on Aug. 25, 2020, 2 pages.

* cited by examiner

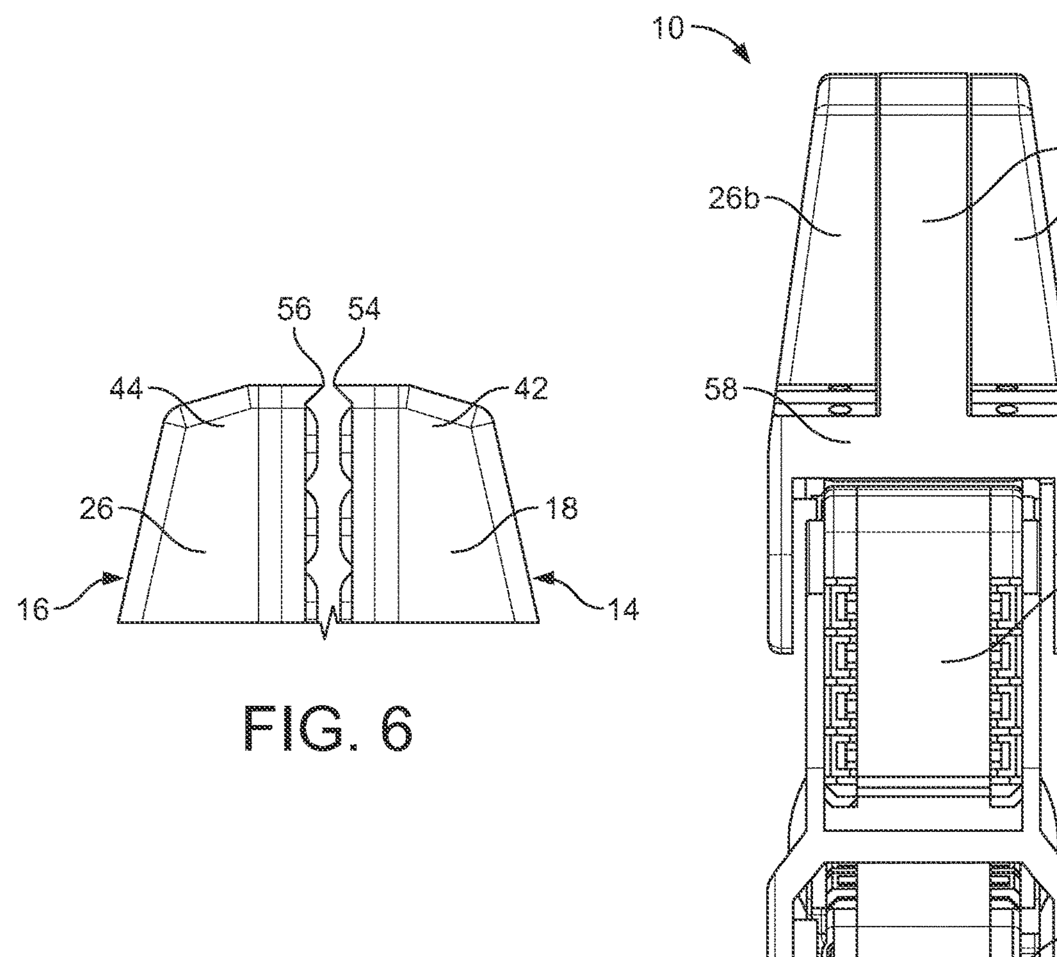
FIG. 6
FIG. 7
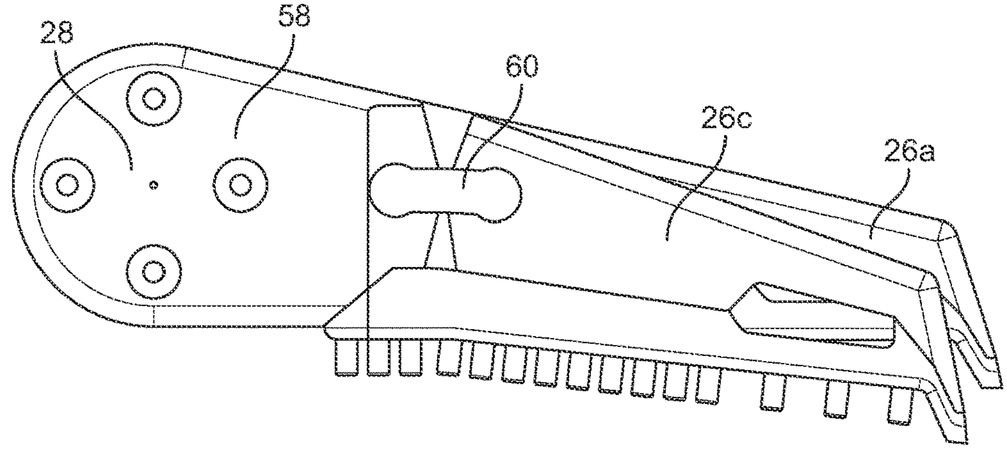
FIG. 8

ROBOT HAND

CROSS-REFERENCE TO PRIOR APPLICATION

This application is a § 371 National Stage Application of PCT International Application No. PCT/GB2021/050463 filed Feb. 24, 2021, which claims the priority of United Kingdom Application No. 2002775.1, filed Feb. 27, 2020, each of which are herein incorporated by reference in their entirety.

TECHNICAL FIELD

The present invention relates to a robot hand. Aspects of the invention relate to a robot gripper and to a robot.

BACKGROUND

Robot devices comprising robotic hands and gripper arrangements (which may also be referred to herein as robot or robotic grippers) are known in industries such as the manufacturing industry. It is often a key capability of such robot devices that they are able to manipulate a range of objects. However, known robotic grippers capable of manipulating objects and picking objects from flat surfaces tend to be complicated in their construction, in particular, where such grippers are designed to closely mimic the human hand.

It is an object of the present invention to provide a robot gripper that mitigates or substantially mitigates the above problems.

SUMMARY OF THE DISCLOSURE

According to an aspect of the present invention, there is provided a robot gripper comprising: a base section; a first finger connected to the base section by a base section joint and comprising n phalanxes; a second finger connected to the base section by a base section joint and comprising n+m phalanxes, each phalanx of the second finger being connected to an adjacent phalanx by a phalanx joint and the first and second fingers being opposable to one other; wherein n and m are positive integers.

The present invention provides a robot gripper where the fingers have an asymmetric arrangement. This arrangement advantageously provides the ability to grip objects and to manipulate them, e.g. by rolling an object between the two fingers). This arrangement also allows the gripper to be handed.

In one arrangement of a robot gripper the values of n and m may both be set to equal 1 such that the first finger comprises a first phalanx connected to the base section by a pivotable joint and the second finger comprises a first phalanx and a second phalanx, the second finger comprising pivotable joints between the base and first phalanx and between the first and second phalanxes. This arrangement conveniently provides for a robot gripper that is compact (it comprises three phalanxes in total) and which is capable of gripping and rolling objects.

The base section may comprise a surface extending between the base section joints, the distance between the base section joints being substantially the same length as the first phalanx of the second finger such that first and second fingers may be brought parallel to one another such that the first phalanx of the first finger is adjacent to the second phalanx of the second finger. The component parts of the robot gripper may conveniently be dimensioned such that the two fingers can be brought together such that their tips meet. This enables the robot gripper to pick up objects more easily.

Each joint may be rotatable about an axis and the axes of all the joints within the robot gripper may be parallel to one another.

Each joint may comprise a motor. In this way the gripper may be fully actuated which allows full control of the fingers of the robot gripper. This aids the gripping positions that the robot gripper may take up.

The motors associated with the first phalanxes may be located within the base section. The motor associated with a second phalanx may be located within the finger. Where the motors are located within the finger, this provides a gripper in which all the control elements are integrated within the gripper itself which allows replacement grippers to be attached to a robot, e.g. via a wrist connection, with minimal difficulty.

The gripper may further comprise an arm section which is rotatably connected to the base via a wrist connection and each motor may be located within the wrist portion remote from the joints, each motor being connected to a joint by a tendon linkage. As an alternative to integrating the motors within the gripper, this arrangement provides a gripper in which the bulk of the gripper is reduced since there is no need to incorporate the motors therein.

Each finger may comprise a tip portion and the fingers may be configured to move between open configurations and a pinch configuration where the tip portions of each finger are in contact. The gripper may advantageously take up a range of open configurations which allows a number of different sizes of object to be gripped.

The first and second fingers may comprise a fingernail protrusion. The provision of a fingernail protrusion allows objects to be picked up more easily.

The gripper may comprises further fingers opposing the first finger, each further finger comprising n+m phalanxes.

The robot gripper may comprise: a base section; a first finger comprising a first phalanx, which is connected to the base section by a joint, and a tip portion distal to the base section; a second finger comprising a first phalanx, which is connected to the base section by a joint, and a tip portion distal to the base section, wherein the first and second fingers are opposable to each other, the first finger comprising an inner surface that faces the second finger and the second finger comprising an inner surface that faces the first finger; wherein the tip portion of one of the fingers comprises a nail protrusion, the nail protrusion being deployable between a deployed configuration and an undeployed configuration.

The robot gripper may be configured such that at least one of the fingers comprises a nail protrusion that is deployable between deployed and undeployed configurations. The nail protrusion advantageously aids with the picking up and gripping of objects, especially small, flat objects on a surface.

The tip portion of the first finger may comprise a nail protrusion and the tip portion of the second finger may comprise a nail protrusion, each nail protrusion being deployable between a deployed configuration and an undeployed configuration, the nail protrusions of the first and second fingers being opposed to one other when in their deployed configurations. Preferably both fingers comprise nail features to aid in the gripping of objects. In such an arrangement both nails can engage on either side of the object.

In the undeployed configuration the nail protrusion may be flush with the inner surface of the finger or may be recessed within the finger. The nail protrusion may in some configurations be configured such that it sits flush with the surface of the finger or even recessed within the finger when in the undeployed configuration.

In the deployed configuration the nail protrusion may project further beyond the inner surface of the finger than in the undeployed configuration. In some configurations the fingernail protrusion may not sit flush or recessed with the finger in the undeployed configuration, in which case when the fingernail is deployed it is arranged to project further beyond the inner surface of the finger than in the undeployed configuration.

At least one of the fingers may comprise a first phalanx and a second phalanx and the tip portion may be integrated in the second phalanx. Where a finger comprises more than one phalanx the fingernail protrusion is advantageously located in the tip portion of the last phalanx.

The inner surface of the or each finger comprising a nail protrusion may be moveable between an undeformed configuration and a deformed configuration and may be configured such that moving the inner surface to the deformed position causes the nail protrusion to be deployed. Conveniently, a nail arrangement can be provided in which moving the inner surface of a finger exposes the nail protrusion. In one version of such a nail arrangement, the finger may be designed to deform to expose a nail protrusion when coming into contact with an object such that no mechanical parts are required.

The or each finger comprising a nail protrusion may comprise a cam mechanism configured to extend the nail protrusion of the or each finger when the robot gripper interacts with an object.

The cam mechanism may be located on the inner surface of the or each finger. The cam mechanism for the or each finger may be located in the base section of the robot gripper.

In an alternative configuration, the or each finger comprising a nail protrusion may comprise a groove within which the nail protrusion is arranged to move, the gripper comprising a linear actuator for each nail protrusion arranged to move each nail protrusion between the deployed and undeployed configurations.

The gripper may comprise further fingers opposing the first finger and each finger may comprise a nail protrusion.

The robot gripper may comprise: a base section; a first finger comprising a proximal phalanx which is connected to the base section by a joint; a second finger comprising a proximal phalanx which is connected to the base section by a joint, the first and second fingers being opposable to each other; wherein the base section comprises a sucker arranged to allow the gripper to interact with objects by suction.

The robot gripper may be configured such that it advantageously comprises a sucker that allows the gripper, when it is already gripping a first object, to manipulate a second object (e.g. opening a door or drawer without needing to put down the first object).

The sucker may comprise a vacuum pump. The sucker may be associated with a vacuum pump which thereby allows a vacuum to be conveniently created and controlled. The vacuum pump may be located within the base section.

The sucker may be a passive sucker that is configured to be activated when the sucker is pushed against an object. As an alternative to a vacuum sucker, a passive sucker may be used which results in an arrangement with fewer parts compared to the vacuum option. Such a passive sucker arrangement would also save space as fewer components would need to be packed into the body of the gripper (or associated robot).

The base section may comprise a palm surface, a back surface and side surfaces, the sucker being located on one of the palm, back or side surfaces.

The robot gripper may comprise one or more suckers located on the same surface of the base section. Additional suckers may be provided to provide a better seal or to compensate if one sucker doesn't form a seal correctly (e.g. because of a surface feature on the second object).

The robot gripper may comprise one or more suckers located on different surfaces of the base section. Providing suckers on different surfaces of the base section allows greater flexibility and reduces the need to rotate or realign the gripper in order to use a sucker.

According to an aspect of the present invention there is provided a robot comprising a robot gripper according to the above aspect of the present invention.

Where the robot gripper is configured to comprise a sucker, the robot may comprise a robot body connected to the robot gripper wherein the sucker may comprise a vacuum pump located within the robot body.

Where the robot gripper is configured to comprise a sucker, according to an aspect of the present invention, there is provided a method of operating a robot gripper or a robot according to the above aspect of the present invention, comprising: manipulating the first and second finger to grip a first object; moving the gripper such that the sucker contacts a second object; forming a vacuum seal between the sucker and the second object; moving the gripper to manipulate the second object; breaking the vacuum seal with the second object; releasing the first object.

Where the second object is a drawer or door, the method may further comprise moving the robot gripper while the vacuum seal is in place in order to open the drawer or door.

Forming the vacuum seal may comprise moving the robot gripper such that the sucker is pushed against the second object.

Breaking the vacuum seal may comprise moving the robot gripper such that the sucker twists relative to the second object.

Forming the vacuum seal may comprise moving the robot gripper such that the sucker contacts the second object and activating a vacuum pump connected to the sucker.

It is noted that the order of the steps in the above method according to the present disclosure may be varied slightly depending on the particular implementation of the method, e.g. certain steps may occur together or in a different order to that shown above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which:

FIG. 6 shows a close up view of a tip portion of the fingers of the robotic gripper of FIG. 1;

FIG. 7 shows a side view of a variant design of a robotic gripper having a phalanx that is split into three sections;

FIG. 8 shows a phalanx of the robotic gripper of FIG. 7;

DETAILED DESCRIPTION

General and specific embodiments of the disclosure will be described below with reference to the Figures. Like numerals have been used to denote like features within the figures.

Figure 1:
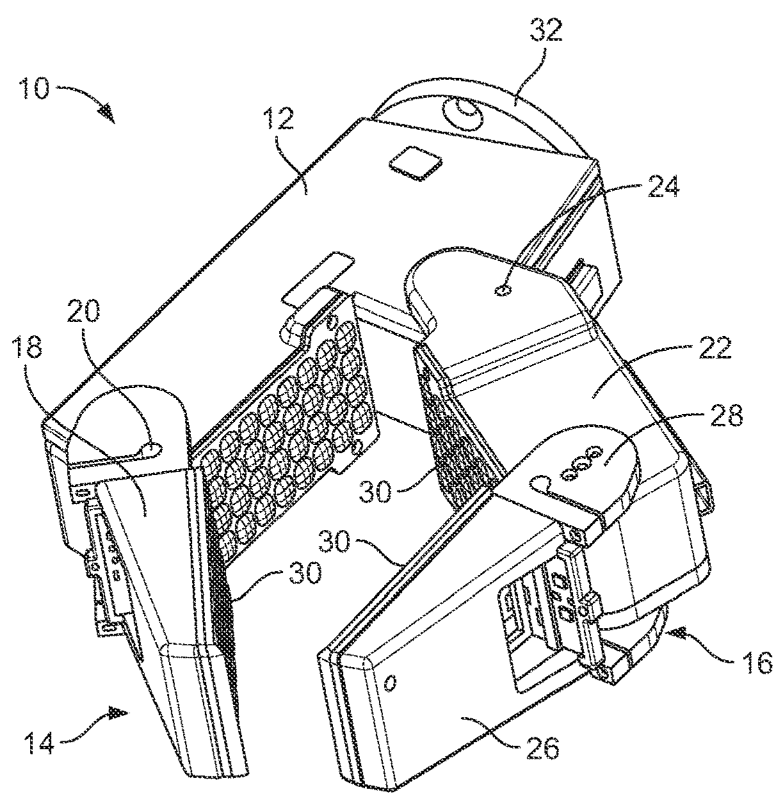
FIG. 1 shows a perspective view of a robotic gripper according to an embodiment of the present invention.

FIG. 1 shows a perspective view of a robot gripper 10 according to an embodiment of the present invention. The gripper 10 comprises a base section 12, a first finger 14 and a second finger 16.

The first finger 14 comprises a first, or proximal, phalanx 18 which is connected to the base section 12 by a joint 20. The second finger 14 comprises a first (proximal) phalanx 22 which is connected to the base section 12 by a (base) joint 24. The second finger 16 further comprises a second (distal) phalanx 26 which is connected to the adjacent proximal phalanx 22 by a (phalanx) joint 28. The first and second fingers (14, 16) are opposable to one another.

For the robot gripper 10 shown in FIG. 1 there are an odd number of joints (in this case 3 joints) and an odd number of phalanxes. The presence of a hand having an uneven number of phalanxes in the opposable fingers results in a "handed" gripper 10 which enables the fingers of the gripper to perform gripping and pinching actions as well as more complicated actions such as rolling an object between the two opposable fingers.

In a more general form, a robot gripper in accordance with an embodiment of the invention comprises a first finger comprising n phalanxes and a second finger with n+m phalanxes, where n and m are positive integers. In the example of FIGS. 1, n=1 and m=1, but it is to be appreciated that other arrangements are possible (e.g. where n=2 and m=1 the first finger would have two (proximal and distal) phalanxes and the second finger would have three (proximal, intermediate and distal) phalanxes). In this regard, the robot gripper is asymmetric.

As shown in FIG. 1, the inner surfaces 30 of the fingers comprise a textured surface to aid gripping of objects. This surface could for example comprise a rubberised material. The robot gripper additionally comprises a wrist connection 32 to enable connection of the gripper 10 to a robot arm (not shown in FIG. 1).

Figure 2:
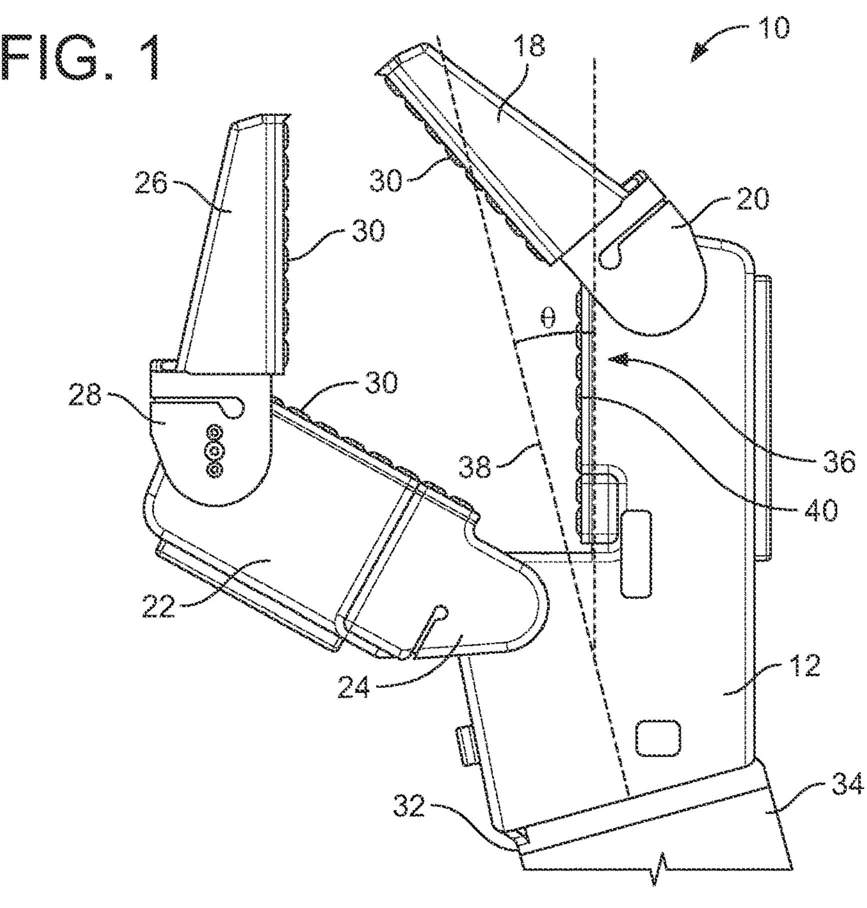
FIG. 2 shows a plan view of the robotic gripper of FIG. 1 in an open configuration.

FIG. 2 shows the gripper 10 of FIG. 1 in a side view in an open "grip" configuration. In FIG. 2 the gripper 10 is additionally shown connected via the wrist connection 32 to an arm 34, the arm 34 and connection 32 defining an axis 38.

The base section 12 comprises a "palm" portion 36, the palm portion including surface 40 of the base section 12 that extends between the first finger/base section joint 20 and the second finger/base section joint 24.

As can be seen from FIG. 2 the surface 40 of the palm portion 26 defines a plane that is at an angle θ to the axis 38. In an embodiment, the angle θ is 15 degrees, or approximately 15 degrees, which allows the robot gripper to grab and pinch objects effectively.

Each joint (20 24, 28) is rotatable about an axis. As shown in FIG. 2, the axes of each joint (20, 24, 28) are parallel to one another and perpendicular to the plane of the figure. Each joint comprises its own motor such that the robot gripper is fully actuated thereby aiding the gripping positions that the gripper can take up.

Figure 5:
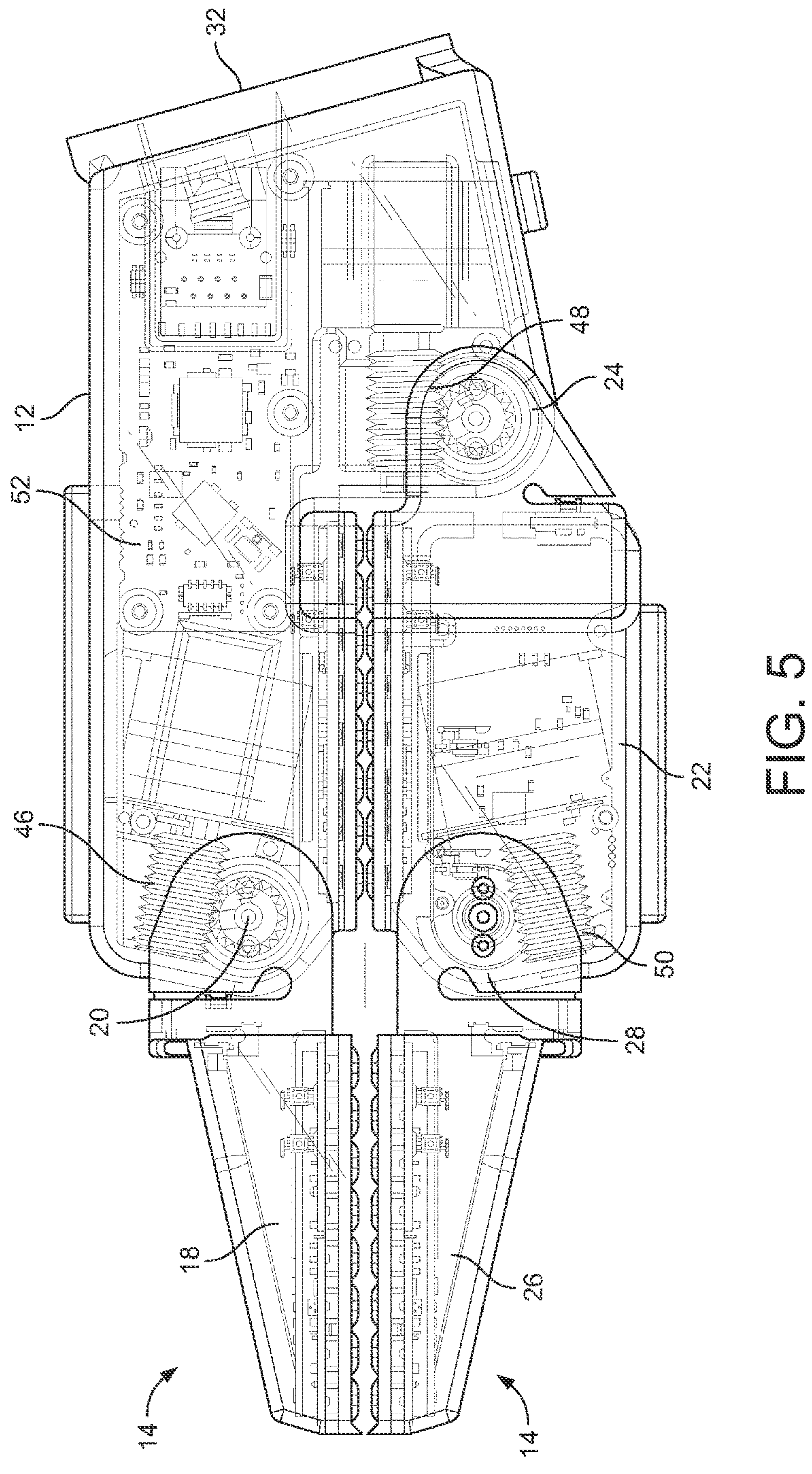
FIG. 5 shows a section through the robotic gripper of FIG. 1.

The motor for each joint may be directly associated with the joint (as shown in FIG. 5 below). Such an arrangement would facilitate replacing the gripper that is connected to the wrist connection with a replacement gripper (in the case of damage) or alternative robotic manipulators.

Alternatively, the motor for each joint may be located remote from the gripper 10 (e.g. within the arm 34) and may be connected to the joint via a suitable mechanical or hydraulic tendon system. This arrangement may enable a less bulky design for the gripper compared to directly locating the motors with each joint within the gripper.

The gripper may be rotatable about the wrist connection to enable the gripper to move between a first handed position and a second handed position.

Figures 3, 4:
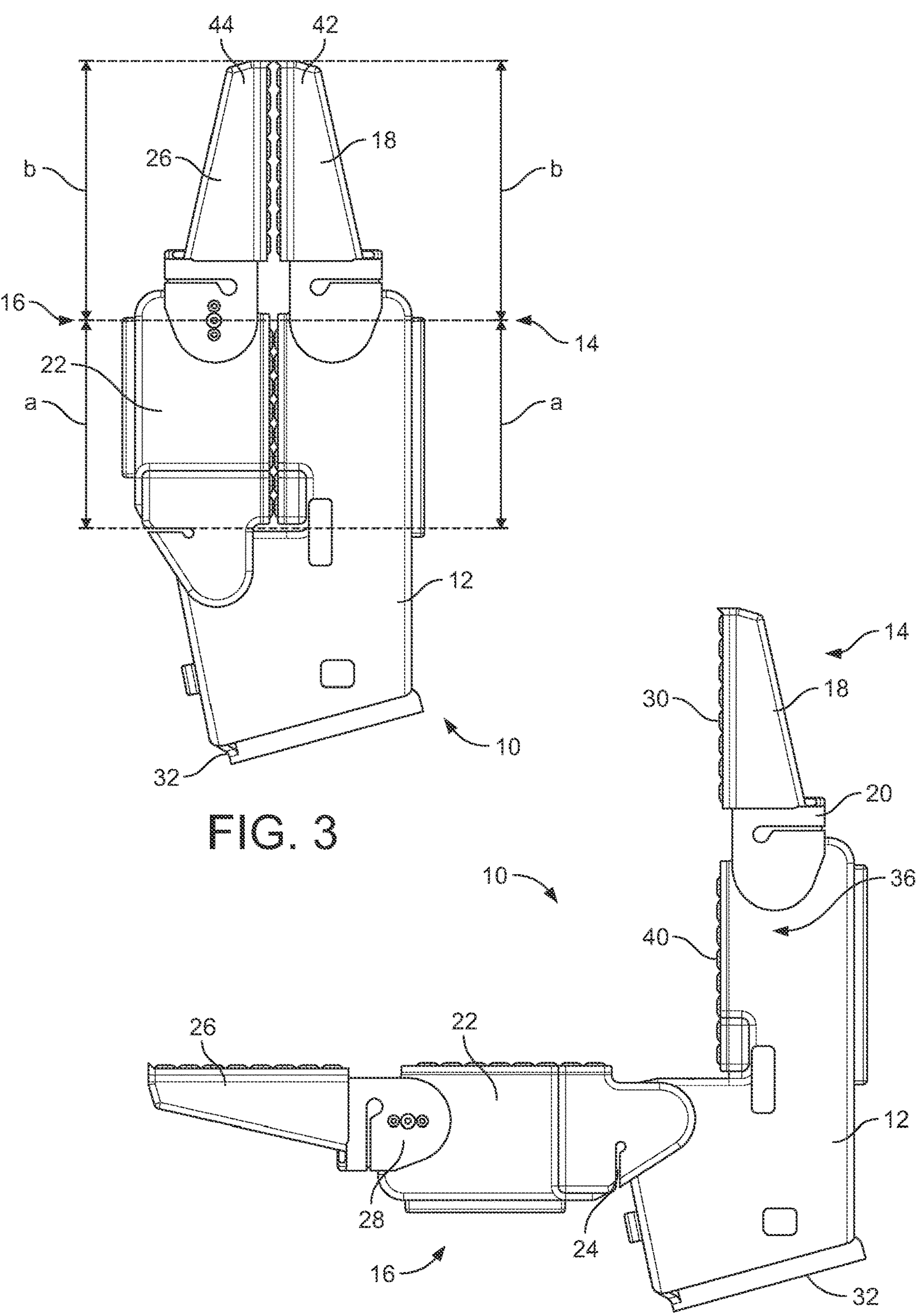
FIG. 3 shows a plan view of the robotic gripper of Figure in a closed configuration.
FIG. 4 shows a plan view of the robotic gripper of FIG. 1 in a further open configuration.

Turning to FIG. 3, the gripper of FIGS. 1 and 2 is shown in a closed configuration (a "pinch" configuration) in which the first and second fingers (14, 16) are arranged parallel to one another.

It is noted that the distance (labelled "a" in FIG. 3) between proximal joints (20, 24) of the first and second fingers (14, 16) on the base section 12 is substantially the same length as the proximal phalanx 22 of the second finger 16 such that first and second fingers may be brought parallel to one another such that the proximal phalanx 18 of the first finger 14 is adjacent to the distal phalanx 26 of the second finger 16.

Additionally, the distance of the first phalanx 18 of the first finger 14 is substantially the same length (labelled "b" in FIG. 3) as the distal phalanx 26 of the second finger 16. As a result, the tip portion 42 of the first finger 14 and the tip portion 44 of the second finger 16 come together.

FIG. 4 shows the gripper 10 in a fully open configuration in which the surface 40 of the base section 12 and the surface 30 of the first finger 14 define a straight line. Additionally, the first and second phalanxes (22, 26) of the second finger 16 define a straight line. As shown in FIG. 4 the first finger 14/base section 12 are at roughly 90 degrees to the second finger 16.

FIG. 5 shows a cross section through a robot gripper 10 in which motors (46, 48, 50) and a control unit 52 are provided within the structure of the gripper 10. Each joint of the gripper comprises its own motor (joint 20 is actuated by motor 46; joint 24 is actuated by motor 48; joint 28 is actuated by motor 50). The control unit 52 is configured to send control signals to each of the motors to control operation of the gripper 10.

The gripper 10 comprises a metal, e.g. aluminium, frame within which the motors and control unit are mounted. The metal frame may be clad in any suitable material to form the gripper 10 (e.g. plastic outer body with rubber grips on the surfaces (30, 40)).

The motors (46, 48, 50) may be configured to measure the torque applied to a joint. Sensors may be disposed within the contact surfaces (30, 40) to detect where contact has been made with objects being manipulated by the gripper 10. The control unit 52 may determine the force applied to a gripped object from the torque and sensor data.

FIG. 6 shows the tip portions (42, 44) of the fingers (14, 16) shown in FIGS. 3 and 5 (the "pinch" configuration) in more detail. It is noted that the phalanx 18 of the first finger 14 comprises a protrusion 54 (a "fingernail" protrusion) that is disposed on the inner surface of the phalanx 18 and which projects towards the other finger 16. Similarly, the distal phalanx 26 of the second finger 16 comprises a protrusion 56 that is disposed on the inner surface of the phalanx 26 and which projects towards the finger 14.

The two protrusions (54, 56) generally provide a pointed tip and thereby facilitate picking up objects from a flat surface. In particular, the provision of such fingernail protrusions allows low profile objects, e.g. coins, sheets of material, to be picked up more easily by the robot gripper that might otherwise be unable to gain sufficient purchase on such objects.

FIGS. 7 and 8 show a variant design of the gripper 10 in which the end phalanx 26 of the finger 16 is split into three sections—a central phalanx portion 26*a* and side portions (26*b*, 26*c*). The phalanx 26 comprises a base portion 58 that comprises the joint 28. The central portion 26*a* is fixed relative to the base portion 58. The side portions (26*b*, 26*c*) are sprung via spring members 60 such that they are biased towards the opposing finger 14.

It is noted that FIGS. 7 and 8 show the three prong variant design on the finger 16. The skilled person will appreciate that the three prong arrangement may instead be used on the phalanx 18 of the first finger 14. Alternatively both fingers 14, 16 may incorporate the arrangement shown.

The sprung side portions (26*b*, 26*c*) facilitate gripping of objects.

Figure 9:
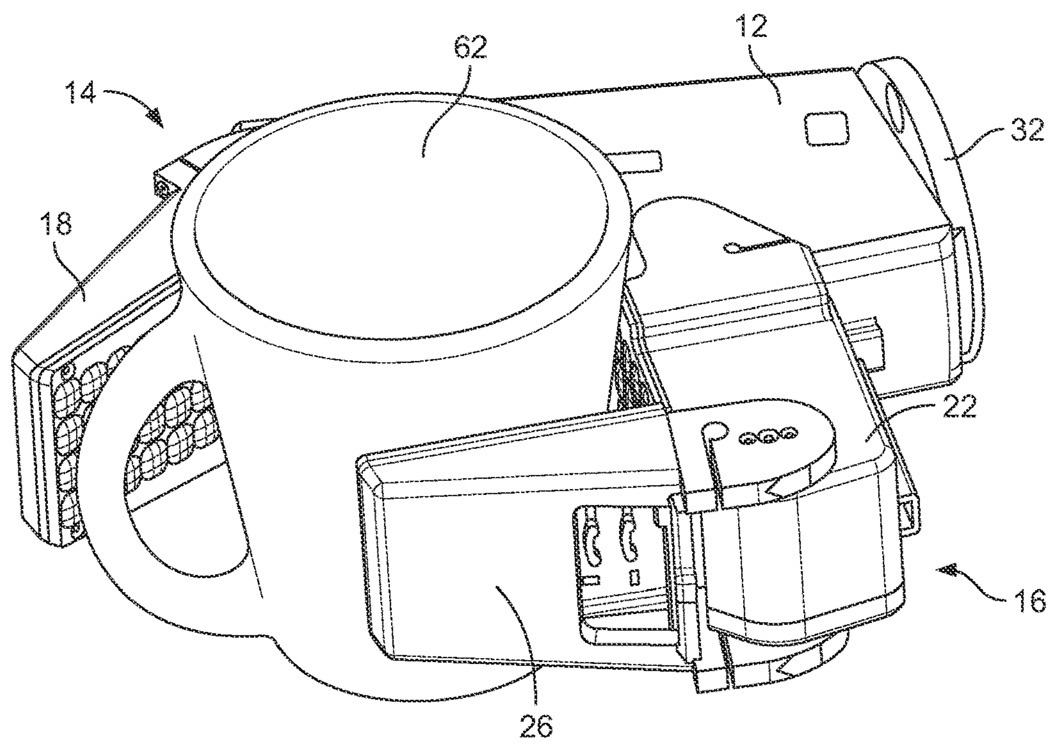
FIGS. 9 to 14 show the robotic gripper of FIG. 1 in a variety of configurations and gripping different objects.
Figure 10:
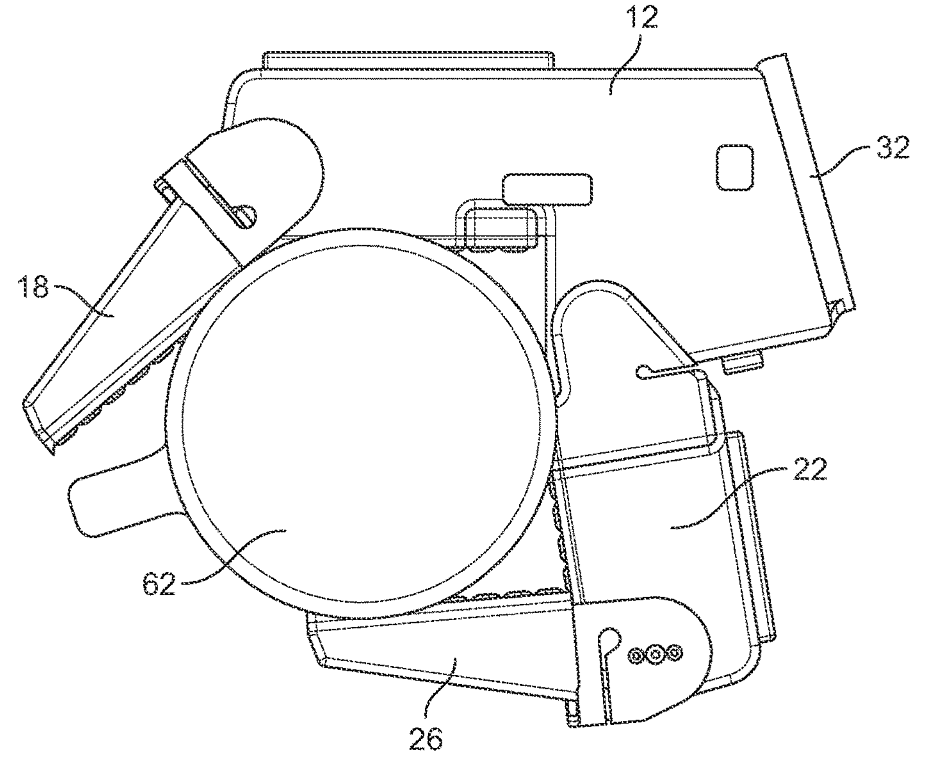
Figure 11:
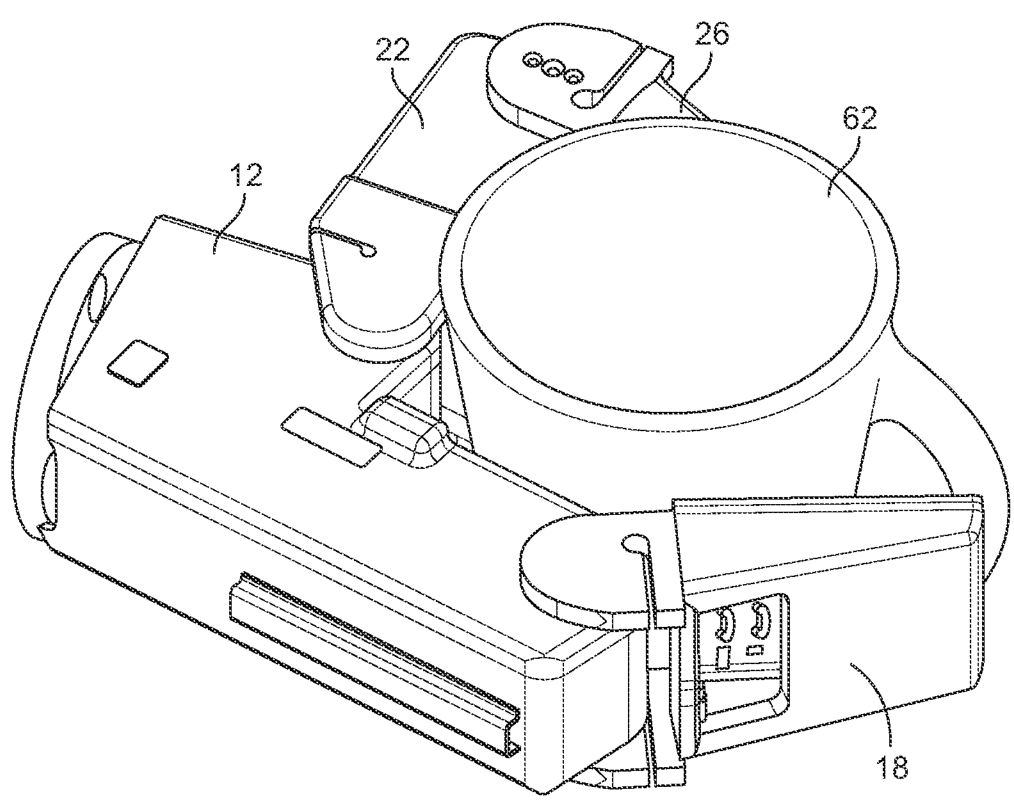

FIG. 9 shows a first perspective view of a gripper 10 according to FIGS. 1 to 6 gripping an object, a cup 62, with the finger 16 at the front of the image. FIG. 10 shows the same interaction from above the gripper 10. FIG. 11 shows a second perspective view of the gripper with the finger 14 at the front of the image. It can be seen that the gripper 10 is in the general grip configuration shown in FIGS. 1 and 2.

Figure 12:
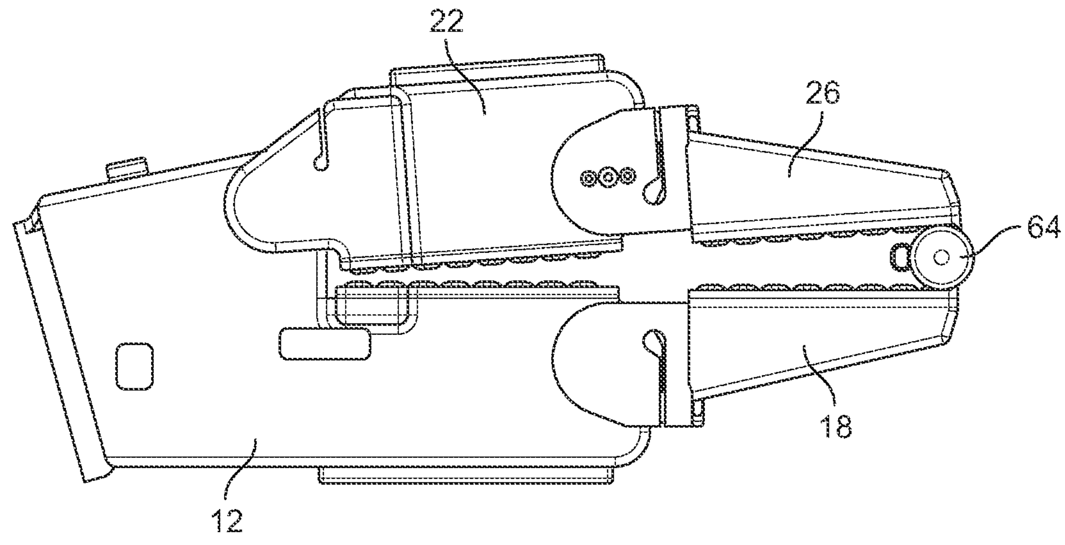
Figure 13:
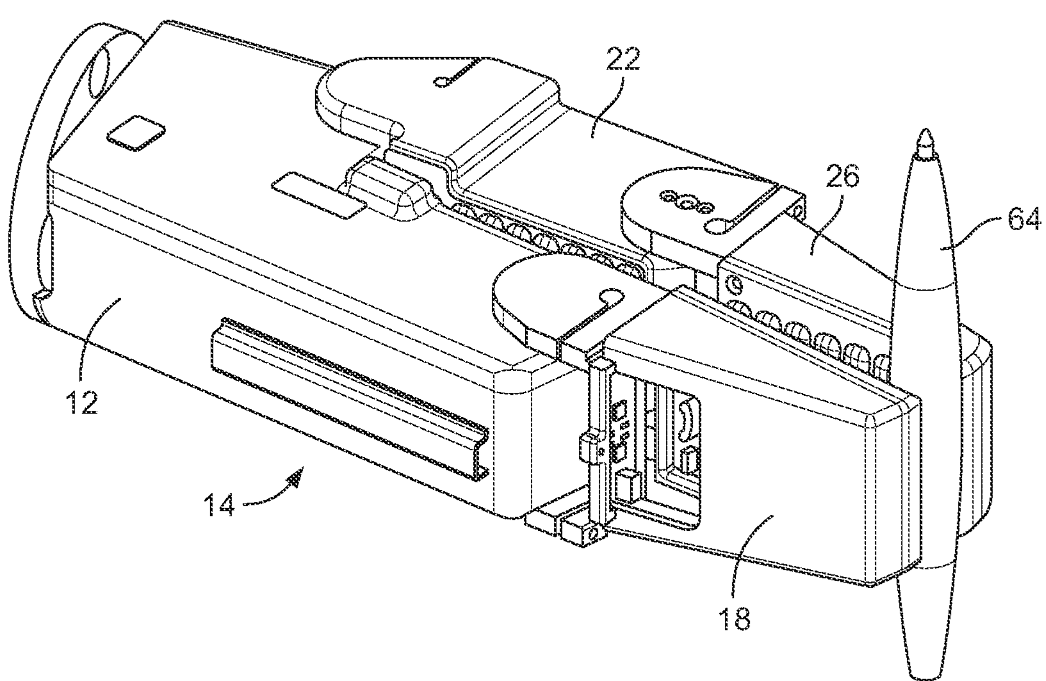
Figure 14:
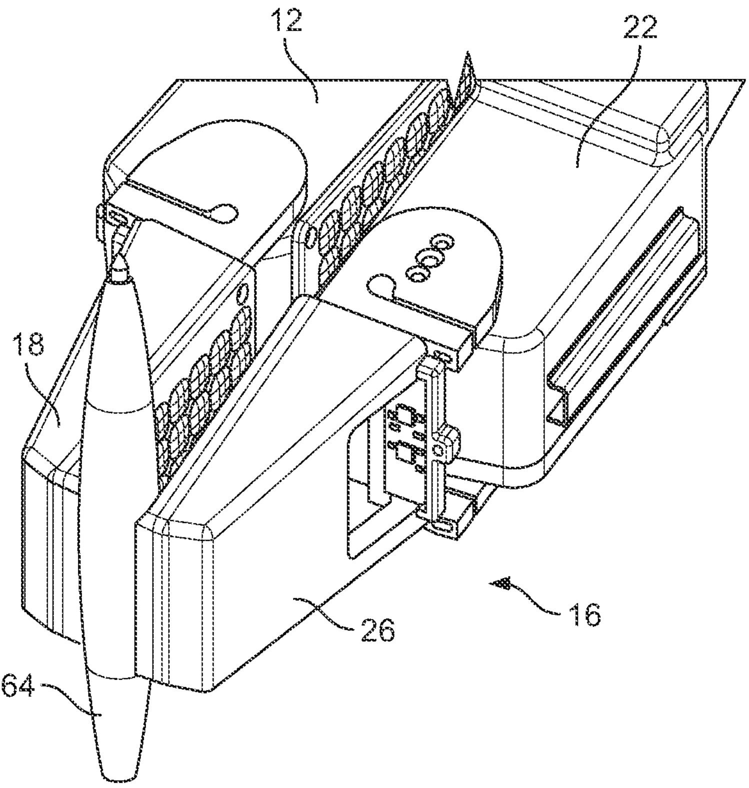

FIG. 12 shows a plan view of a gripper 10 according to FIGS. 1 to 6 gripping a further object, a pen 64. It can be seen that the gripper 10 is in the pinch configuration shown in FIGS. 3 and 5. FIG. 13 shows a first perspective view of the gripper 10 with the finger 14 at the front of the image. FIG. 14 shows a second perspective view of the gripper with the finger 16 at the front of the image. The robot gripper allows the second finger 16 to flex via the phalanx joint 28 such that the second phalanx 26 can roll the pen along the phalanx 18 of the first finger.

Figure 15:
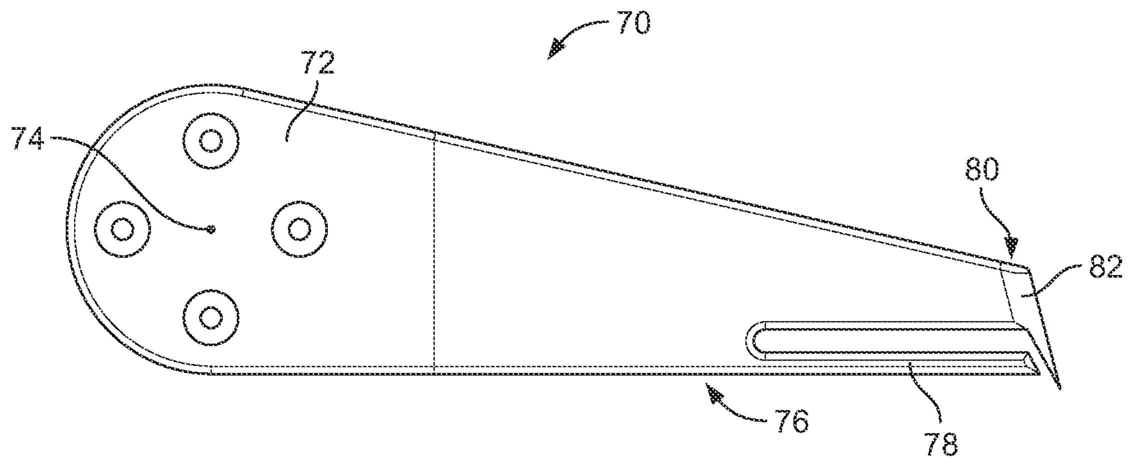
FIG. 15 show a phalanx comprising a nail protrusion in an undeployed configuration for a finger of a robotic gripper according to an embodiment of the present invention.
Figure 16:
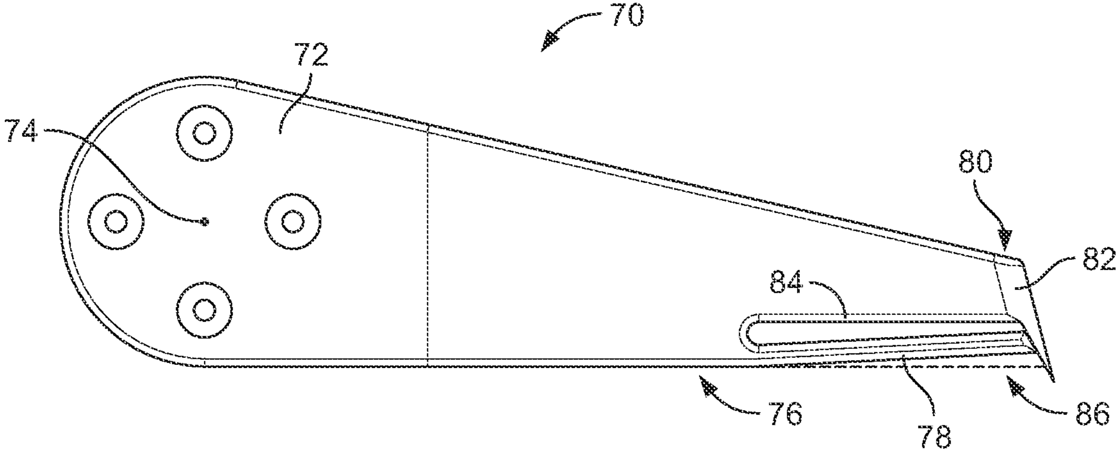
FIG. 16 shows the phalanx of FIG. 15 in a deployed configuration.

FIGS. 15 and 16 show a configuration for a phalanx 70 for a finger of a robot gripper comprising a nail protrusion that can deploy from an undeployed configuration (shown in FIG. 15) to a deployed configuration (shown in FIG. 16) according to an embodiment of the present invention. As described below, the nail protrusion arrangement shown in FIGS. 15 and 16 is a passive arrangement in which the nail moves from the undeployed to the deployed configurations on contact with an object. This contrasts with the active nail protrusion arrangements shown in FIGS. 17 to 22 in which a cam arrangement or linear actuator arrangement is used to deploy the nail protrusions.

Returning to FIGS. 15 and 16, the phalanx 70 comprises a base portion 72 within which a joint 74 is provided. It is noted that the phalanx 70 of FIGS. 15 and 16 may be incorporated into one or more fingers of a robot gripper. For example, the phalanx 70 may be incorporated into one or both of the phalanxes 18 or 26 described above.

The phalanx 70 comprises an inner surface 76 which, when the phalanx 70 is provided on a finger of a robot gripper, faces another finger on the gripper. The inner surface 76 comprises a deformable section 78. The deformable section 78 is provided distal to the joint 74.

The phalanx 70 further comprises a tip portion 80 which comprises a nail protrusion 82 which, when the phalanx 70 is provided on a finger of a robot gripper, projects towards another finger on the gripper.

In FIG. 15 the phalanx 70 is in the undeployed configuration in which the nail protrusion 82 does not substantially project beyond the inner surface 76 of the phalanx.

In FIG. 16 the phalanx is shown in the deployed configuration. The phalanx 70 may be deployed to the deployed configuration when the phalanx 70/gripper 10 comes into contact with an object (not shown). As the object contacts the deformable section 78, the deformable section 78 is deflected into a cavity 84 within the body of the phalanx 70. The previous position of the inner surface of the deformable section 78 is shown in FIG. 16 by the dotted line 86. It can be seen that in the deployed configuration the nail protrusion 82 now projects further beyond the inner surface of the section 78 and can be used to aid in picking up small objects (especially on a flat surface) and to improve grip.

The fingernail configuration shown in FIGS. 15 and 16 conveniently provides improved gripping ability without the need for further motors or other mechanical activation means since the fingernails are provided by the deformable section 78 of the finger.

FIGS. 17 to 21 show a further configuration for a finger of a robot gripper comprising a nail protrusion that can deploy from an undeployed configuration to a deployed configuration according to an embodiment of the present invention. As described below, the nail protrusion arrangement shown in FIGS. 17 to 21 is an "active" arrangement in which the nail moves from the undeployed to the deployed configurations in response to movement of a cam arrangement that is linked to the nail protrusion. This contrasts with the passive nail protrusion arrangements shown in FIGS. 15 and 16 above in which contact with an object is used to deform the finger to deploy a fingernail protrusion.

For ease of reference the nail protrusion arrangement according to FIGS. 17 to 21 are shown incorporated into the robot gripper 10 of FIGS. 1 to 14. It is however noted that the nail protrusion arrangement could be incorporated into any suitable robot gripper. It is further noted that both fingers (14, 16) in FIGS. 17 to 21 are shown to comprise a nail protrusion arrangement but the skilled person will appreciate that the arrangement may only be present on one or other of the fingers.

Figures 17, 18:
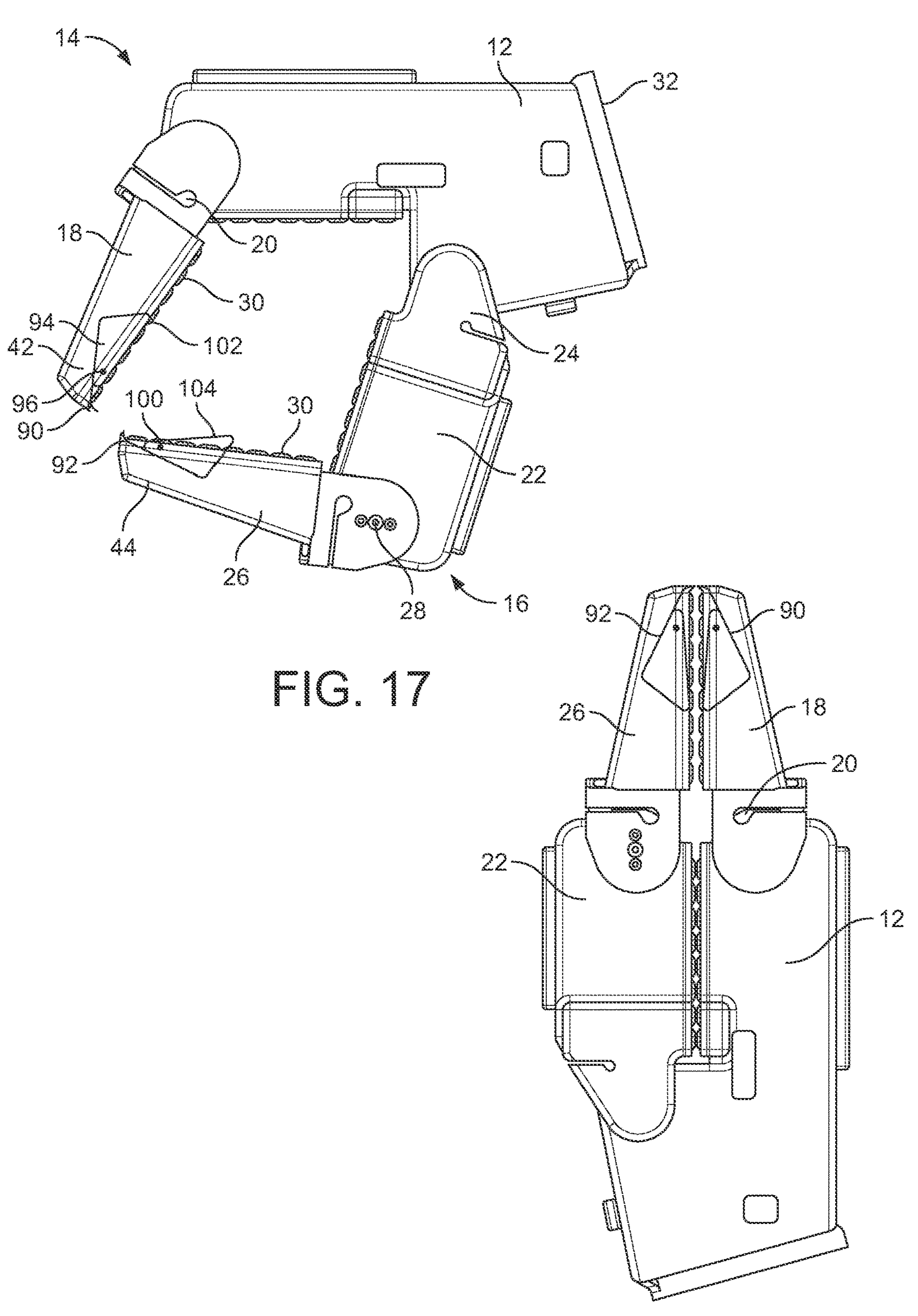
FIG. 17 shows a plan view of a robotic gripper having a nail protrusion according to an embodiment of the present invention.
FIG. 18 shows the gripper of FIG. 17 when the gripper is closed.

As shown in FIG. 17, finger 14 comprises a nail protrusion 90 within the tip portion 42 of the phalanx 18. The nail protrusion 90 is connected to a cam arrangement 94. The cam arrangement is mounted on a pivot 96.

Also shown in FIG. 17 is a further nail protrusion 92 within the tip portion 44 of phalanx 26 of finger 16. Nail protrusion 92 is connected to cam arrangement 98 which is mounted on pivot 100.

Nail protrusion 90 and cam arrangement 94 are shown in a deployed configuration and it can be seen that the inner surface 102 of the cam (the "object contacting" side) is substantially flush with the inner surface 30 of the phalanx 18. In the deployed configuration, the nail protrusion 90 projects beyond the inner surface 30 of the phalanx 18.

Nail protrusion 92 and cam arrangement 98 are shown in an undeployed configuration. In this configuration the nail protrusion does not substantially project beyond the inner surface 30 of the phalanx 26 (and may be completely recessed within the body of the phalanx 26). Inner surface 104 of cam arrangement 98 is raised above the inner surface 30 of the phalanx 26.

The cam arrangements 94 and 98 may be biased towards the undeployed configuration about their respective pivots (96, 100), the cam arrangements (94, 98) being configured to move to their respective deployed configurations upon contact of an object with the cam arrangements. [Note: cam arrangement 94 is shown in the deployed configuration in FIG. 17 but for clarity the object in contact with the cam arrangement is not shown.]

As shown in FIG. 18, the cam arrangements 94 and 98 may be activated by each other, thereby deploying the nail protrusions 90 and 92, when the fingers 14 and 16 are brought into the "pinch" configuration shown in FIG. 18 (and FIG. 3).

Figure 19:
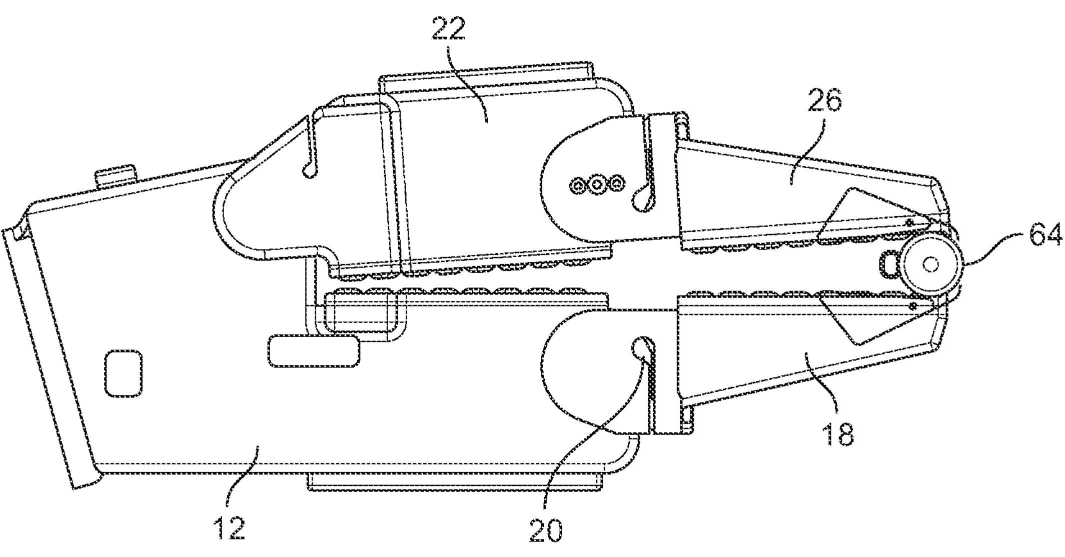
FIG. 19 shows the gripper of FIG. 17 while holding an object.

As shown in FIG. 19, the cam arrangements (94, 98) have been activated, thereby deploying the nail protrusions 90, 92, as the fingers 14, 16 grip the object (pen) 62.

Figure 20:
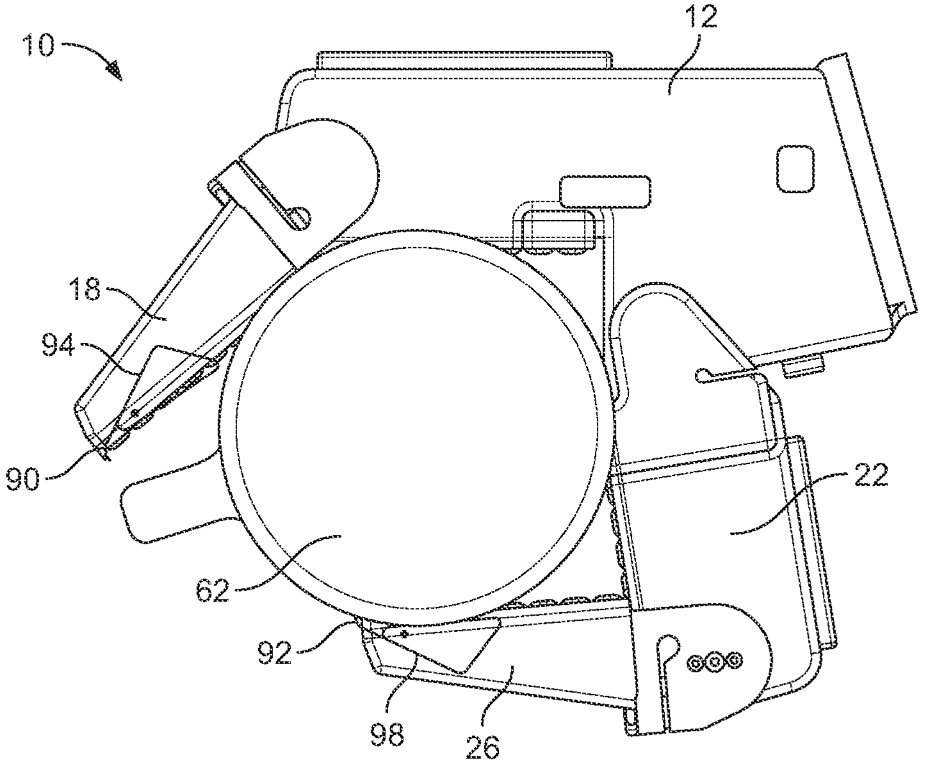
FIGS. 20 to 21 show the gripper of FIG. 17 holding a further object.
Figure 21:
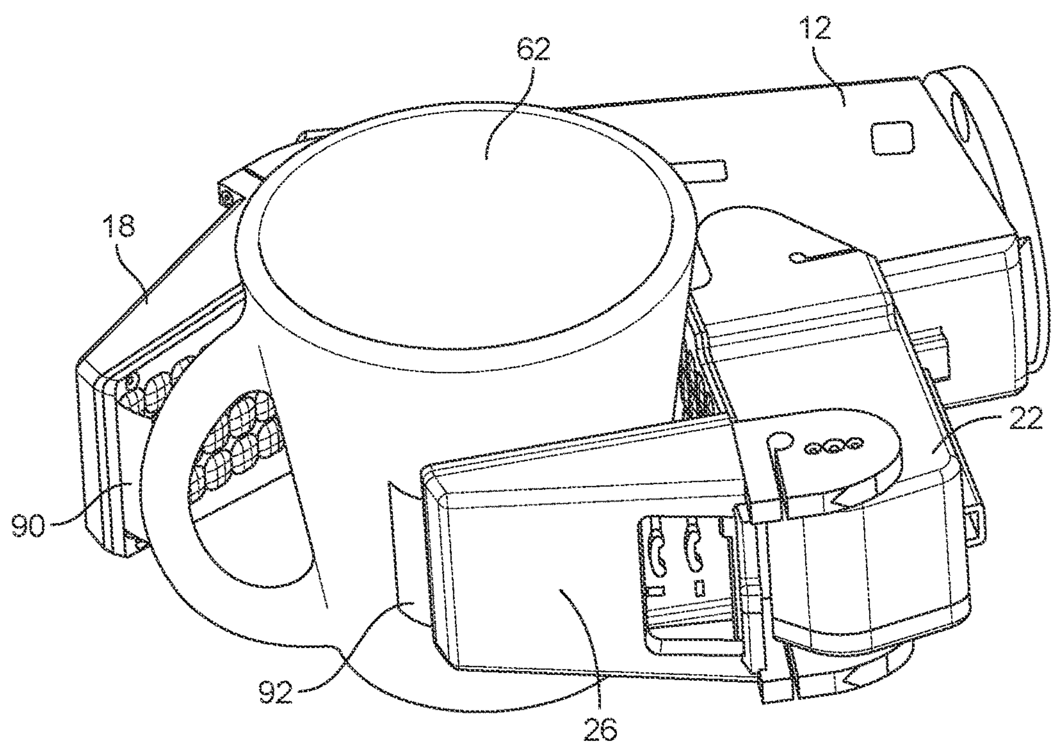

FIGS. 20 and 21 show respectively a plan and perspective view of the nail protrusion arrangement of FIGS. 17 and 18 while the gripper 10 is holding a larger object, cup 62.

Figure 22:
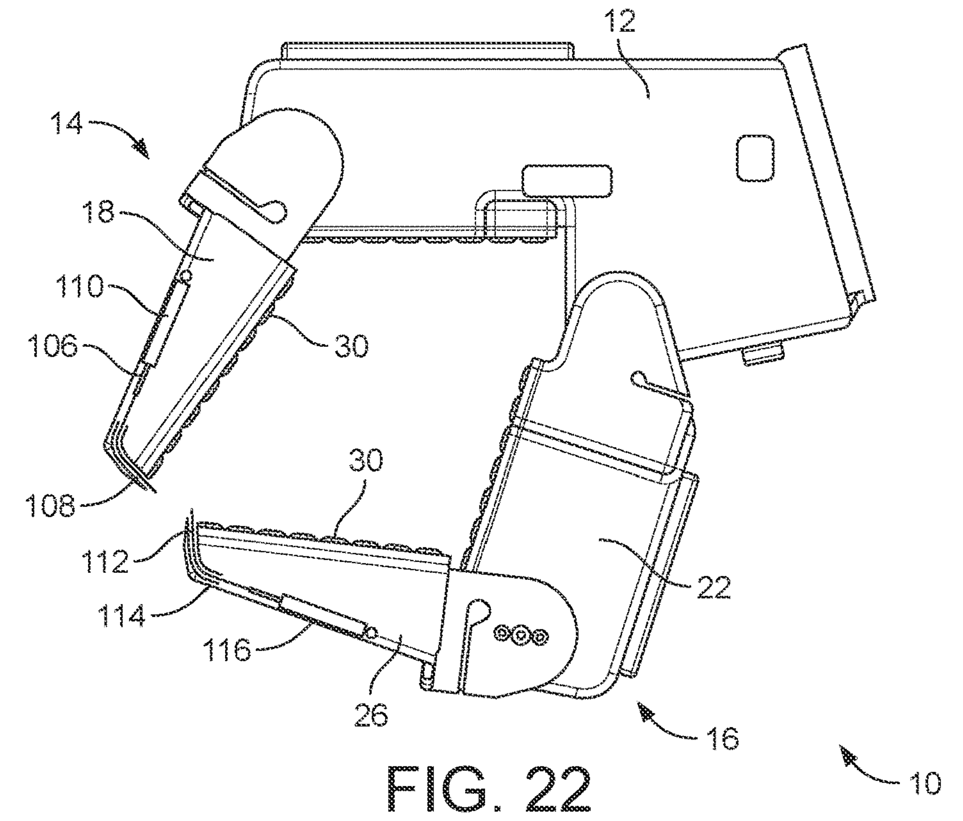
FIG. 22 shows a plan view of a robotic gripper having a nail protrusion according to an embodiment of the present invention.

FIG. 22 shows a further "active" nail protrusion arrangement in accordance with an embodiment of the present invention in which a linear actuator is used to deploy the finger protrusions.

For ease of reference the nail protrusion arrangement according to FIG. 22 is shown incorporated into the robot gripper 10 of FIGS. 1 to 14. It is however noted that the nail protrusion arrangement could be incorporated into any suitable robot gripper. It is further noted that both fingers (14, 16) in FIG. 22 are shown to comprise a nail protrusion arrangement but the skilled person will appreciate that the arrangement may only be present on one or other of the fingers.

In FIG. 22, phalanx 18 of finger 14 comprises a groove 106 within the body of the phalanx. A nail protrusion 108 is located within the groove 106 and may moved between an undeployed configuration in which the nail protrusion 108 is recessed within the groove 106 and a deployed configuration in which the nail protrusion 108 projects beyond the inner surface 30 of the phalanx 18. The nail protrusion 108 is deployed by a linear actuator 110 located within the phalanx 18. The linear actuator 110 may in turn be controlled by control signals received from a control unit (e.g. control unit 52 shown in FIG. 5).

Finger 16 shown in FIG. 22 shows a corresponding nail protrusion 112 within a groove 114 within the phalanx 26. Linear actuator 116 is configured to deploy the nail protrusion 112 between deployed and undeployed configurations.

FIGS. 23 to 26 show a gripper comprising a sucker according to an embodiment of the present invention. For ease of reference the sucker according to FIGS. 23 to 26 is shown incorporated into the robot gripper 10 of FIGS. 1 to 14. It is however noted that a sucker could be incorporated into any suitable robot gripper.

Figure 23:
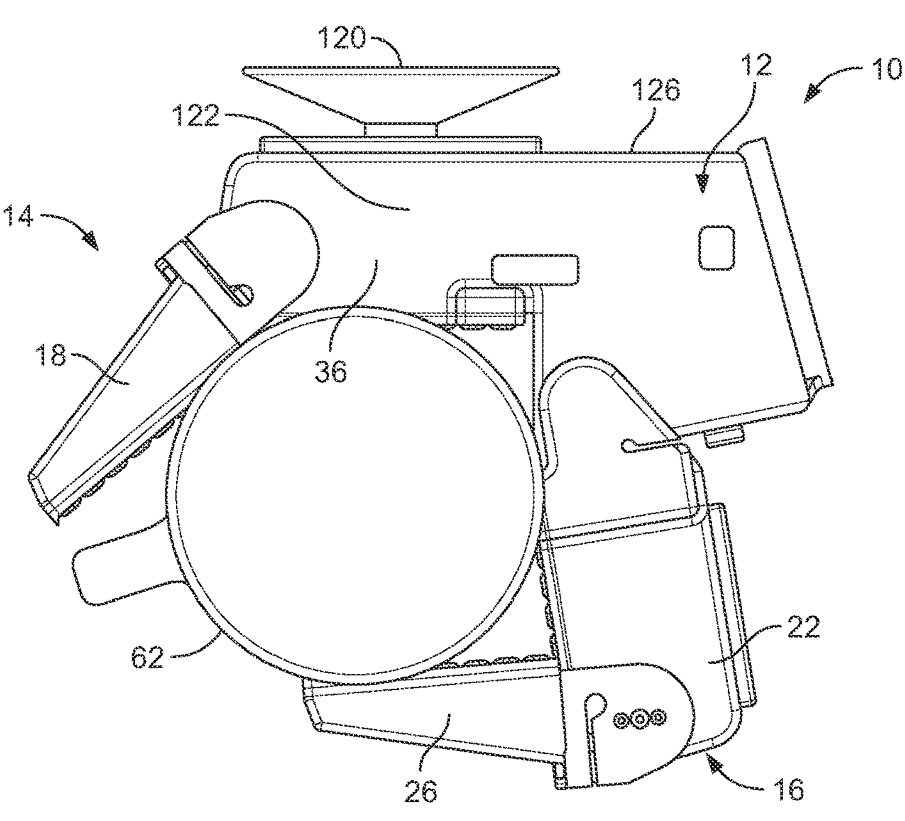
FIG. 23 shows a plan view of a robotic gripper having a passive sucker according to an embodiment of the present invention.
Figures 25, 26:
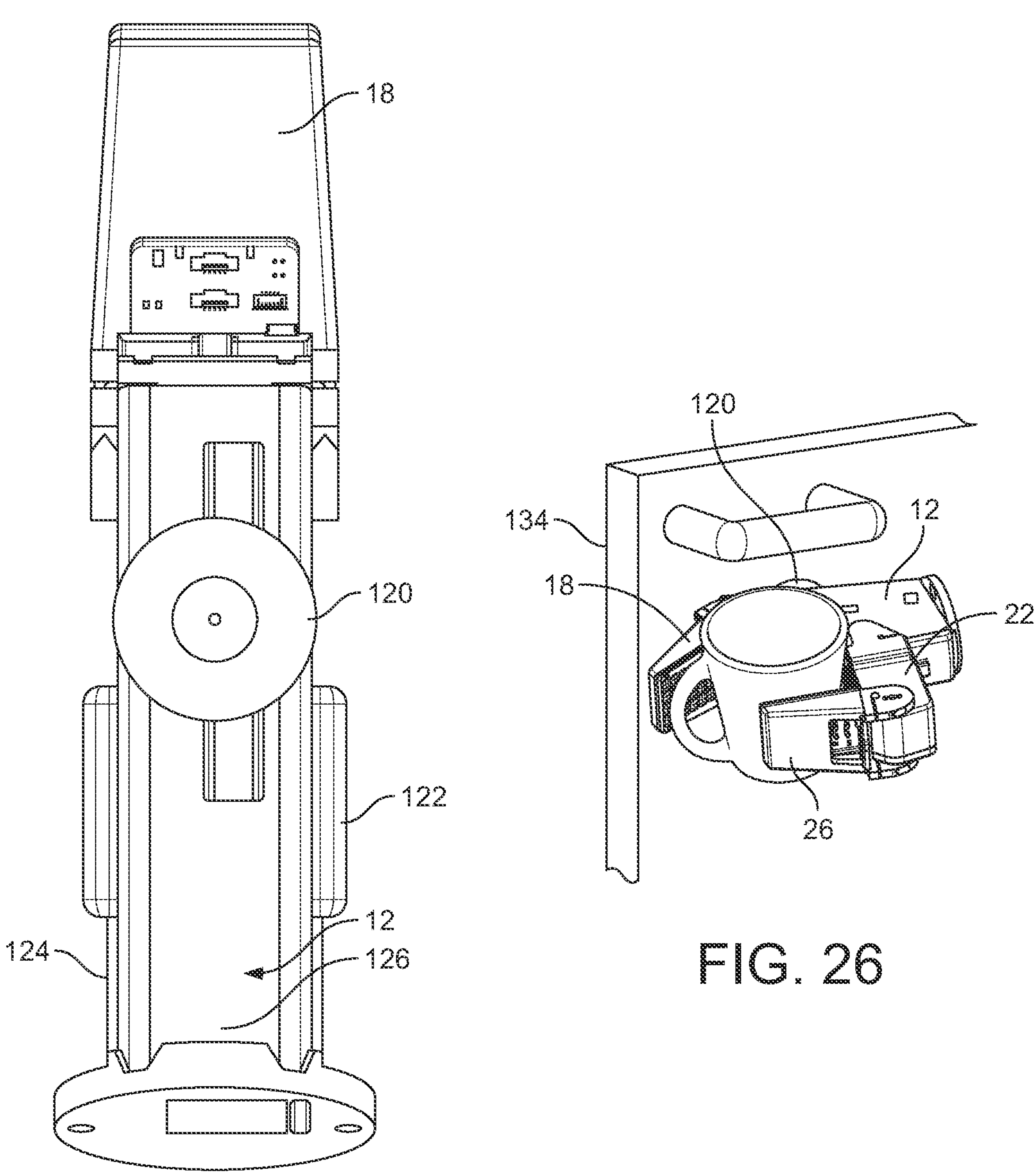
FIG. 25 shows a side view of the gripper of FIG. 23 or 24.
FIG. 26 shows a gripper according to FIG. 23 or 24 interacting with a cupboard door.

FIG. 23 shows the gripper 10 described above in relation to FIGS. 1 to 14. Additionally, the base section 12 comprises a sucker 120 mounted thereon. As previously described the base section 12 comprises a palm portion 36. Additionally, it is noted that the base section comprises side surfaces 122 and 124 (surface 122 is shown in FIG. 23 and both surfaces 122, 124 are shown in FIG. 25) and a back surface 126. As shown in FIG. 23 the sucker 120 is mounted on the back surface 126 of the base section 12.

Although a single sucker 120 is shown in FIGS. 23 to 26 it is to be appreciated by the skilled person that multiple suckers may be mounted on the gripper. Furthermore, a sucker or suckers may be provided on other surfaces of the gripper 10, e.g. the side surfaces 122, 124.

Figure 24:
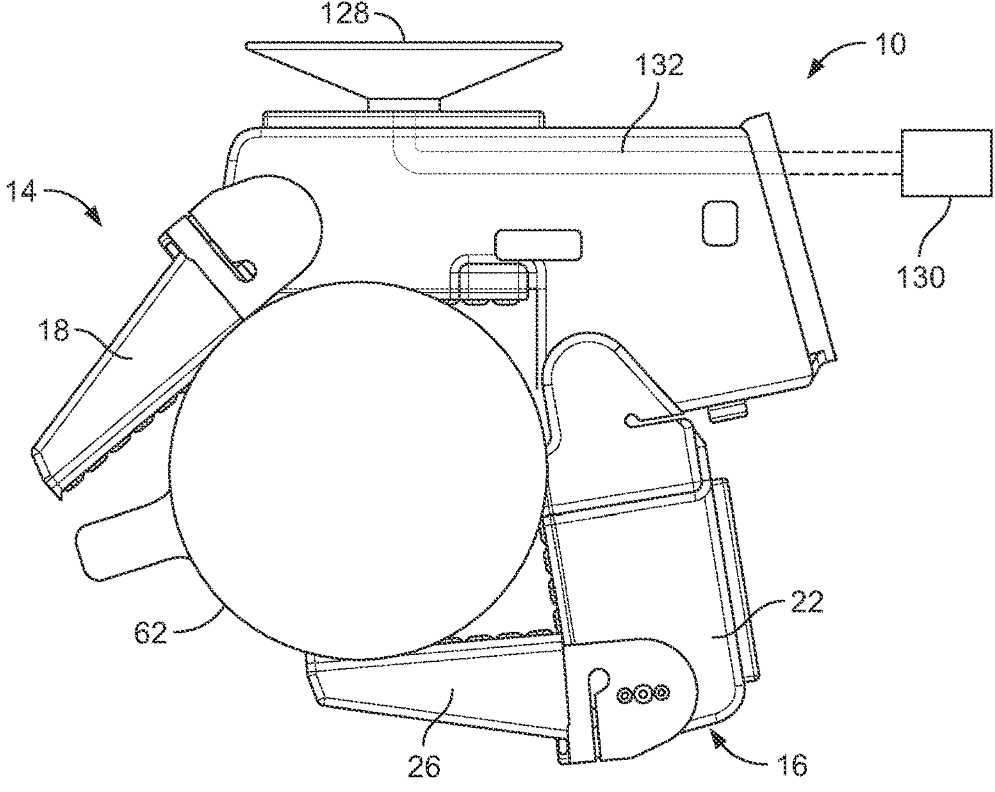
FIG. 24 shows a plan view of a robotic gripper having a vacuum sucker according to an embodiment of the present invention.

The sucker 120 shown in FIG. 23 is a passive sucker that is activated when the sucker is pushed against an object. FIG. 24 shows an example of a vacuum sucker 128 which is connected to a vacuum pump 130 by a conduit 132. It is noted that the vacuum pump may be located within the robot gripper 10 or remote from the gripper 10 (e.g. within a robot arm 34 as shown in FIG. 2 or at any suitable location within a robot comprising a robot gripper as shown in FIG. 24).

The sucker 120, 128 according to an embodiment of the present invention may be used, as shown in FIG. 26, to interact with an object, such as a door 134, when the gripper 10 is gripping an item (such as the cup 62 shown in FIG. 26). In this manner the gripper 10 may complete tasks, such as putting an item into a cupboard, in a single sequence (e.g. grip item, engage sucker with door 134, open door, place item into cupboard) instead of having to put the item down in order to use the gripper fingers 14, 16 to open the door.

Figure 27:
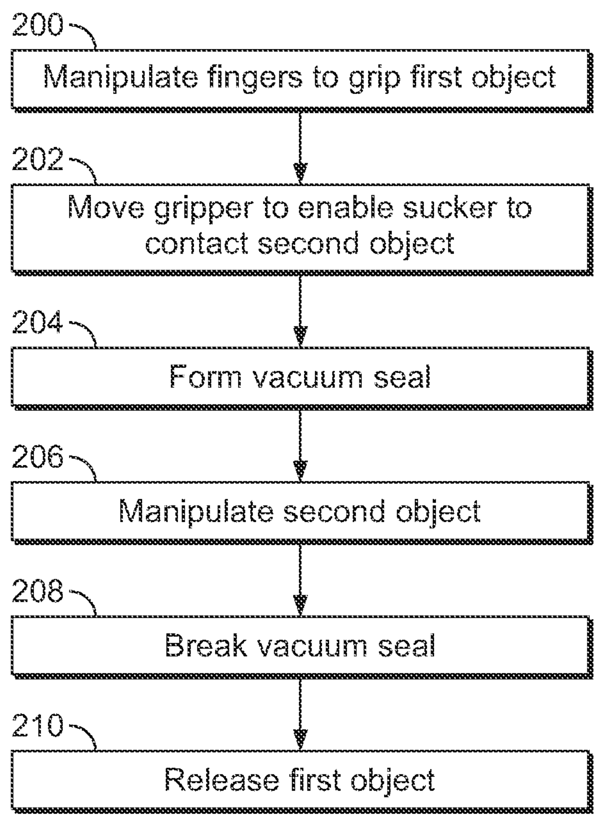
FIG. 27 is a flow chart showing how a gripper according to FIG. 23 or 24 may be operated.

FIG. 27 is a flow chart of a method of using the gripper 10 shown in FIGS. 23 to 26. In step 200 the first and second fingers (14, 16) are manipulated to grip a first object. Once the first object has been grasped by the gripper 10, the gripper is moved, in step 202, such that the sucker contacts a second object.

In step 204 a vacuum seal is formed between the sucker (120, 128) and the second object. The vacuum seal may be formed by pressuring the sucker against the second object (in the case of a passive sucker) or by using a vacuum pump 130 to form a vacuum between the sucker and the second object.

In step 206 the gripper 10 may be moved in order to manipulate the second object. For example, if the second object is a drawer or cupboard door then the gripper may be moved in order to open or close the drawer/door.

In step 208 the vacuum seal is broken. This may be achieved either by turning off the vacuum pump or by controlling the gripper to twist relative to the second object (or a combination of both).

Figure 28:
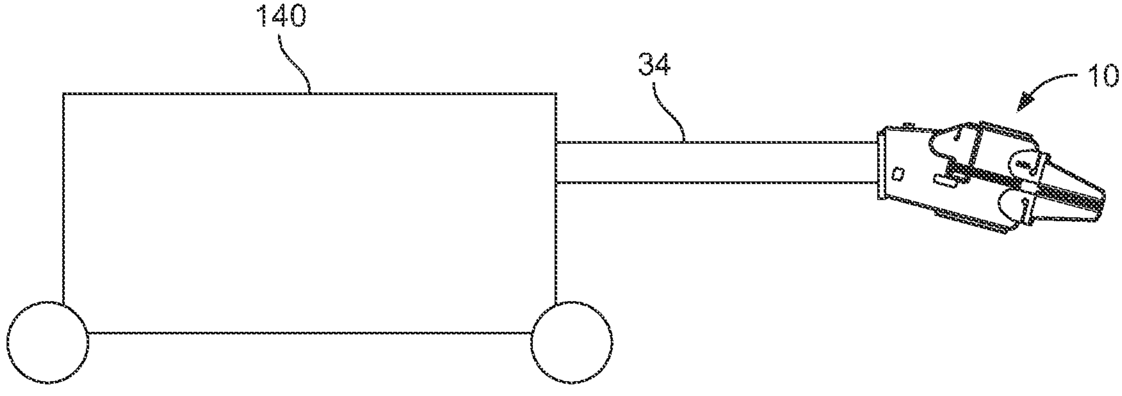
FIG. 28 shows a robot comprising a robotic gripper according to an embodiment of the present invention.

In step 210 the first object may be placed and then released. FIG. 28 shows a robot 140 comprising an arm 24 and a robot gripper 10 according to any of the above FIGS. 1 to 26.

Many modifications may be made to the above examples without departing from the scope of the present disclosure as defined in the accompanying claims.

The invention claimed is:

1. A robot gripper comprising:

a base section;

a first finger comprising a first phalanx connected to the base section by a first base section joint; and a second finger connected to the base section by a second base section joint and comprising first and second phalanxes, wherein the first phalanx of the second finger is connected to the base section by the second base section joint, wherein the second phalanx is connected to the first phalanx of the second finger by a phalanx joint, wherein the first and second base section joints and the phalanx joint are pivotable joints, and the first and second fingers being opposable to one other, wherein the base section comprises a surface extending between the first and second base section joints, a distance between the first and second base section joints being substantially the same length as the first phalanx of the second finger such that the first and second fingers may be brought parallel to one another such that the first phalanx of the first finger is adjacent to the second phalanx of the second finger.

2. The robot gripper as claimed in claim 1, wherein each of the first and second base section joints and the phalanx joint is rotatable about an axis and the respective axes of the first and second base section joints and the phalanx joint within the robot gripper are parallel to one another.

3. The robot gripper as claimed in claim 1, wherein each of the first and second base section joints and the phalanx joint comprises a motor.

4. The robot gripper as claimed in claim 3, wherein the respective motors associated with the first phalanxes are located within the base section.

5. The robot gripper as claimed in claim 4, wherein the motor associated with the second phalanx is located within the second finger.

6. The robot gripper as claimed in claim 3, further comprising an arm section which is rotatably connected to the base section via a wrist connection and wherein each motor is located within the wrist connection remote from the first and second base section joints and the phalanx joint, each motor being connected to a corresponding one of the first and second base section joints and the phalanx joint by a tendon linkage.

7. The robot gripper as claimed in claim 1, wherein each of the first and second fingers comprises a tip portion and the first and second fingers are configured to move between an open configuration and a pinch configuration where the respective tip portions of the first and second fingers are in contact.

8. The robot gripper as claimed in claim 1, wherein the first and second fingers comprise a fingernail protrusion.

9. The robot gripper as claimed in claim 1, further comprising further fingers opposing the first finger, each further finger comprising at least two phalanxes.

10. A robot comprising the robot gripper according to claim 1.

11. The robot gripper as claimed in claim 1, wherein the first and second fingers are configured to move between an open configuration and a pinch configuration, wherein when the first and second fingers are in the pinch configuration, the surface of the base section is disposed adjacent and faces the first phalanx of the second finger.

12. The robot gripper as claimed in claim 11, wherein the surface of the base section lies on an imaginary plane, and wherein each of the first and second base section joints is offset from the imaginary plane.

13. The robot gripper as claimed in claim 12, wherein the first and second base section joints are offset from the imaginary plane in opposite directions normal to the imaginary plane.

14. The robot gripper as claimed in claim 11, wherein when the first and second fingers are in the open configuration, the first and second fingers are oriented perpendicular relative to one another.

15. The robot gripper as claimed in claim 11, wherein when the first and second fingers are in the pinch configuration, the first and second fingers are oriented parallel relative to one another.

16. The robot gripper as claimed in claim 1, wherein the base section includes a projection standing proud from the surface of the base section, wherein the second base section joint is provided on the projection.

* * * * *